(12) United States Patent
Uhlig

(10) Patent No.: US 6,370,958 B1
(45) Date of Patent: Apr. 16, 2002

(54) METHOD OF MEASURING THE VIBRATION DAMPING CAPABILITY

(75) Inventor: Robert P Uhlig, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/736,535

(22) Filed: Dec. 11, 2000

(51) Int. Cl.[7] ................................................. G01M 7/00
(52) U.S. Cl. ............................... 73/662; 73/579; 73/660; 73/11.05
(58) Field of Search ........................... 73/662, 579, 660, 73/657, 667, 668, 663, 573, 574, 11.05

(56) References Cited

U.S. PATENT DOCUMENTS

| | | | |
|---|---|---|---|
| RE23,090 E | 3/1949 | Firestone | 73/630 |
| 2,618,968 A | 11/1952 | McConnell | 73/597 |
| 3,417,610 A | 12/1968 | Nance et al. | 73/622 |
| 4,095,475 A | 6/1978 | Buckley | 73/628 |
| 4,513,620 A | 4/1985 | Uretsky et al. | 73/664 |
| 4,523,666 A * | 6/1985 | Murray | 188/218 |
| 4,543,827 A | 10/1985 | Tominaga et al. | 73/602 |
| 4,979,394 A | 12/1990 | Higo et al. | 73/602 |
| 5,179,860 A | 1/1993 | Tsuboi | 73/579 |
| 5,887,686 A * | 3/1999 | Tanaka et al. | 188/250 E |
| 6,014,899 A | 1/2000 | Uhlig et al. | 73/664 |

* cited by examiner

Primary Examiner—Hezron Williams
Assistant Examiner—Jacques Saint-Surin
(74) Attorney, Agent, or Firm—Ralph E. Smith

(57) ABSTRACT

The vibration damping capability of a test part can be computed by vibrating the test part at different frequencies, and measuring the amplitude of the vibrational wave generated in the test part at each input frequency. The test data can be used to generate a measurement curve plotting vibration amplitude against frequency.

12 Claims, 2 Drawing Sheets

METHOD OF MEASURING THE VIBRATION DAMPING CAPABILITY

FIELD OF THE INVENTION

The invention relates to a method of measuring the damping capability of a test part, e.g. a brake rotor. The invention is useful for predicting the noise level (or squeal) produced by a brake rotor during a vehicle braking operation.

BACKGROUND OF THE INVENTION

U.S. Pat. No. 6,014,899 issued Jan. 18, 2000, relates to a method of measuring the vibration damping capability of a part, such as a brake rotor, wherein a vibrational input of a specified frequency is applied at one point on the part surface, and a vibrational output is measured at a point located directly across from the input point, i.e. one hundred eighty degrees from the input point. The amplitude of the vibrational wave at the output location is measured while the vibrational input is terminated abruptly, so that the output vibration is allowed to decay. During the decay period the amplitude of the wave motion gradually decreases from the amplitude measured at the instant the input wave is terminated. The rate of decay of the output wave provides an indication of the vibration damping capability of the tested part. The slope of the output wave amplitude peaks during the decay period can be used to compute a damping capability known as the Q-factor.

It is noted in U.S. Pat. No. 6,014,899 that the Q-factor for a given test part can vary, depending on the point where the input vibrational force is applied (measured circumferentially around the part surface). Variability of the measured Q-factor is due in part to the previously unaccounted presence of a second or twin vibrational bending mode displaced forty five degrees away from the first, as measured circumferentially around the test part. The frequency of the second vibrational mode can vary from the applied frequency as much as five hertz. When the measured Q-factor is plotted against the vibrational force input location on an X-Y graph, the Q-factor varies sinusoidally, with a period of forty five degrees. The point of maximum vibrational excitation (and maximum Q-factor) is termed the antinode, and the point of minimum vibrational excitation (and minimum Q-factor) is termed the node.

In order to compensate for variations in the measured Q-factor (due to variation in the location where the measurement is taken), it is proposed in U.S. Pat. No. 6,014,899 to take measurements at various points along the part circumference. The Q factor measurements can be averaged to provide a single Q-factor representative of the damping capability of the tested part.

U.S. patent application Ser. No. 09/519,485, filed on Mar. 6, 2000 relates to an improvement on the invention disclosed in U.S. Pat. No. 6,014,899. U.S. Ser. No. 09/519,485 provides a method for locating the antinodes on the test part, so that the Q-factor needs to be computed only for one antinode location for each of the twin nodes and points proximate to that antinode location, e.g. locations within about nine degrees on either side of the located antinode.

U.S. patent application Ser. No. 09/578,341 (attorney docket No. 99-1625), filed on May 24, 2000, now U.S. Pat. No. 6,257,063, relates to a further improvement on the invention disclosed in U.S. Pat. No. 6,014,899. The referenced patent application provides a method of vibrating the test part with an exciter coil that is supplied with an AC current whose amplitude is symmetrical with respect to the zero current axis. With such an arrangement the vibration frequency of the tested part is twice the current excitation frequency. The method used to vibrate the part is advantageous in that a relatively low cost amplifier can be used, while achieving an A.C. waveform that is repeatable, without uncertainties as to amplifier performance.

A common feature of the inventions disclosed in U.S. Pat. No. 6,014,899 and the referenced patent applications is the use of a decaying output wave motion to measure the damping capability of the test part. In each case, changes in amplitude of the decaying wave are measured. For example, in an illustrative arrangement a real time analyzer measures the time required for the decaying wave to experience a predetermined change in amplitude, e.g. from a 90 decibel value to a 65 decibel value. Decay measurements are taken in real time at a specified invariant wave frequency.

SUMMARY OF THE INVENTION

The present invention relates to a method of measuring the vibration damping capability of a test part, wherein the tested part is subjected to various different steady state frequencies in order to determine a damping capability Q-factor. As compared to prior methods carried out in the time domain, the present invention is carried out in the frequency domain.

In general, when the test part is subjected to the resonant frequency the amplitude of the output wave will be relatively high. As the frequency of the applied wave is increased or decreased from the resonant frequency, the amplitude of the output (measured) wave will decrease from its maximum. It is possible to construct an X-Y graph plotting the applied frequency against the amplitude of the output wave. The plotted curve will have a shape that is generally sinusoidal, with the resonant frequency being located at the peak of the sinusoid. Preferably the raw data points are passed through a fast Fourier transform analyzer, to improve the accuracy and repeatability of the final test result.

It is believed that by subjecting the test part to a range of different frequency input signals, the computed Q-factor will be a reliable representation of the damping capability of the test part. The computed Q-factor provides an indication of damping performances that might be expected under a variety of different operating conditions. The measurements used in practice of this invention can be performed quickly with the aid of a computer. Computation of a single Q-factor can be accomplished in a relatively short time period.

Specific features of the invention will be apparent from the attached drawings and description of an apparatus that can be used in practice of the invention.

DESCRIPTION OF A PREFERRED EMBODIMENT OF THE INVENTION

Figure 2:
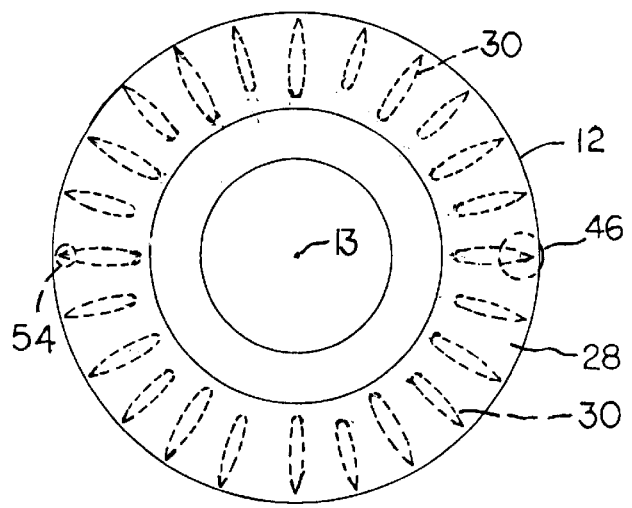
FIG. 2 is a top plan view of the FIG. 1 apparatus, taken in the direction of arrow 2 in FIG. 1.
Figure 1:
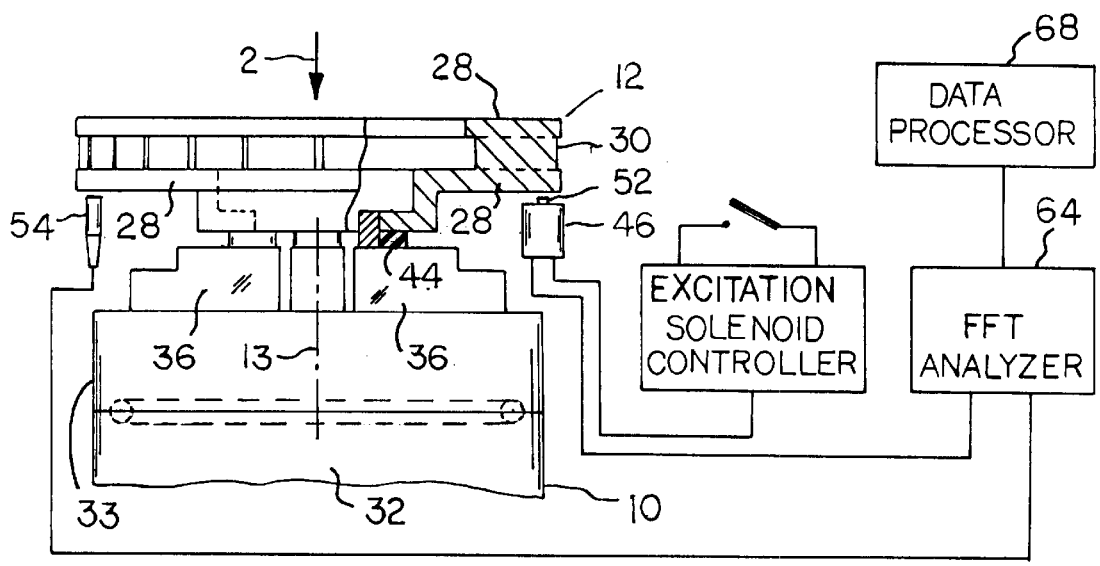
FIG. 1 is a schematic representation of an apparatus that can be used to practice the method of this invention.

FIGS. 1 and 2 show an apparatus that can be used for vibrating a part whose damping capability is to be measured. In this case the part to be tested (vibrated) is a brake rotor 12 having two side plates 28 connected by a series of radial vanes 30.

Vibrator 10 has essentially the same construction as the vibrator shown in U.S. Pat. No. 6,014,899. As herein shown, the vibrator includes a fixed base 32 that supports a rotary turntable 33; lock mechanisms (not shown) are used to set the turntable in selected positions of rotary adjustment.

A centering mechanism is provided on the turntable for aligning rotor 12 with the turntable axis 13. As shown, the centering mechanism includes three evenly spaced jaws 36 that can be simultaneously adjusted along radial lines, whereby the jaws can engage the inner edge of a rotor side plate 28 to center the rotor. A vibration isolating pad 44 is associated with each jaw 36 for isolating vibration and energy transmission between the turntable and rotor 12. The vibration isolating action improves the accuracy of the test data by minimizing the influence of external factors, i.e., boundary conditions.

The sample rotor 12 is placed on the elastomeric isolating pads 44, and the chuck jaws 36 are adjusted to simultaneously contact the edge of rotor plate 28, thereby centering the rotor. Jaws 36 are then retracted toward axis 13, leaving the brake rotor supported only by contact with the isolating pads 44.

Either an exciter coil or impact solenoid 46 is vertically positioned at a predetermined vertical spacing from the lower side plate 28. As shown, an exciter coil 46 is located proximate to the outer edge of plate 28, so that plate 28 can be in the magnetic flux path generated by the magnetic core of the exciter coil. The exciter coil 46 electromagnetically induces vibrations in rotor 12. An AC current waveform supplied to the exciter coil produces a pulsing magnetic field in core 52. Preferably the excitation current frequency is one half the frequency induced in the part being tested, as described in the aforementioned U.S. Pat. No. 6,257,063 (Atty. Dkt. 99-1625). Each cycle in the AC current waveform produces two magnetic flux changes in the core such that part 12 vibrates at twice the frequency of exciter coil 46. If an impact solenoid is chosen as the wave source, each strike of rotor 12 provides a square wave excitation at a predetermined force; thus multiple frequencies are input to the rotor.

The level or amplitude of vibrations induced in rotor 12 is measured with a transducer such as microphone 54 which may include a preamplifier. The microphone is also carefully positioned adjacent the rotor at a predetermined horizontal and vertical spacing from side plate 28. In the example of FIG. 1 the transducer microphone is positioned diametrically across or 180° from the exciter coil 46.

With the exciter coil and transducer aligned with the rotor such as described above, an output waveform of constant amplitude is delivered through a fast Fourier transform (FFT) analyzer 64 to a data processor 68. The (FFT) analyzer smoothes the data points so that the waveform delivered to the data processor has a sinusoidal character. Thus, the sine wave input supplied to the test part 12 via exciter coil 46, (or the square wave input supplied via impact solenoid) translates into a smooth amplitude versus frequency output from the fast Fourier transform analyzer 64.

Figure 3:
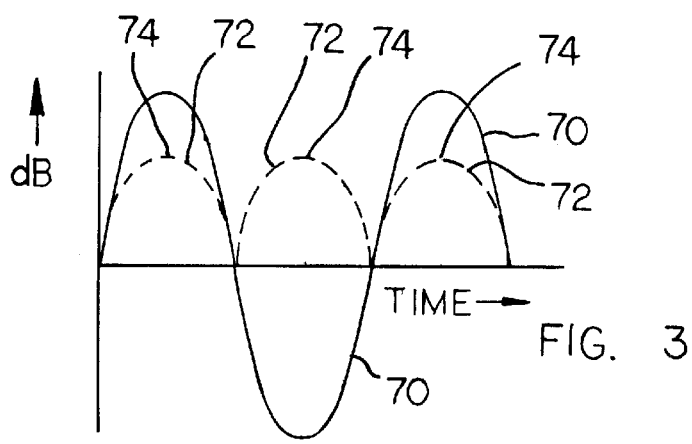
FIG. 3 is a graph showing an input waveform and an output waveform employed in practice of the invention.

FIG. 3 shows a relationship that can exist between the input waveform generated by coil 49 at one point on the surface of test part 12 and the output waveform delivered from a diametrically opposed point on the test part surface to microphone 54. In FIG. 3 the sinusoidal input waveform is denoted by numeral 70, and the sinusoidal output waveform is denoted by numeral 72. It will be seen that the output waveform has a lesser amplitude than the input waveform 70, due to the damping action of the test part as the wave travels through the test part.

It was noted earlier that the damping capability factor Q can vary, depending on the point on the test part where the input vibrational force is applied. The point on the test part exhibiting maximum vibrational excitation is termed the antinode; the point of minimum vibrational excitation is termed the node.

Under the present invention the Q factor measurement process is carried out, with the test part adjusted so that the input waveform is applied at an antinode location on the test part. This requires a preliminary excitation of the test part to determine an antinode location.

When an exciter coil is used, a sinusoidal voltage, of known amplitude and frequency, is applied to the test part, with the part in a selected position of rotational adjustment. The resulting output waveform is delivered from microphone 54 to data processor 68, via the fast Fourier transform analyzer. The frequency versus amplitude waveform is stored in the data processor.

Turntable 33 is then rotated an incremental distance around central axis 13, e.g. eight degrees, to bring a different point on the surface of test part 12 into alignment with exciter coil 46. The exciter coil is then energized a second time, to cause another output waveform to be delivered from microphone 54 through the FFT analyzer 64 to the data processor. The second resulting waveform is stored in the data processor.

The process is repeated enough times to determine an antinode location on the test part surface. At each adjusted position of the test part the output waveform 72 will have a peak value, designated by numeral 74 in FIG. 3. The individual peaks 74 will be higher or lower on the Y axis, in accordance with the adjusted position of test part 12. This variation in the value of the amplitude peak 74 will be sinusoidal in nature.

Figure 4:
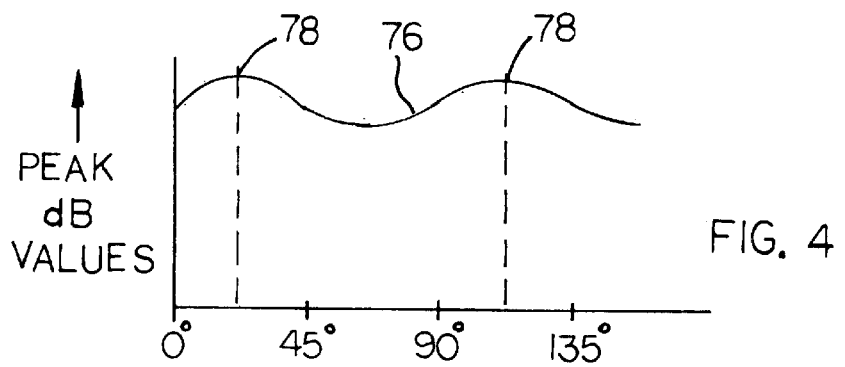
FIG. 4 is a graph depicting a waveform produced by amplitudes peaks of output waves achieved by varying the wave input location along a test part surface, according to the invention.

Data processor 68 is programmed to detect the peak values 74 in the stored output waveforms, and to generate a curve plotting the peak values against the rotated position of the test part 12. FIG. 4 is a graph showing generally how the output waveform peaks 74 vary as test part 12 is rotationally adjusted. The curve 76 in FIG. 4 can be used to locate (with reasonable accuracy) antinode locations on the test part that are suitable for measuring the damping capability of test part 12. In FIG. 4 two antinode locations 78 are identified (peak points on curve 76). Either antinode location can be used.

After an antinode location has been located, further measurements are preformed with the test part 12 set so that exciter coil 46 is aligned with the antinode point on the test part surface (and/or points displaced only slightly from the antinode point). The damping capability factor-Q is computed by subjecting the test part to input sine waveforms having a common amplitude but, a variable frequency.

The output waveform resulting from each input frequency is passed through the FFT analyzer 64 and stored in data processor 68. The data processor detects the peak values for the stored output waveforms, and generates the curve 80 shown in FIG. 5. Typically , curve 80 is generated by varying the input frequency around the resonant frequency of the test part, so that half the data points are at frequencies above the resonant frequency, and half the data points are below the resonant frequency. The number of frequencies (data points) can vary, depending on the accuracy desired and the capability of the FFT analyzer 64.

The damping capability factor Q is herein determined as the peak value 89 on curve 80 divided by the difference between the upper and lower frequency values at 3 db down from the peak (i.e. the half power point). Q can be defined by the equation:

$$Q = \frac{f_p}{f_h - f_l}$$

Figure 5:
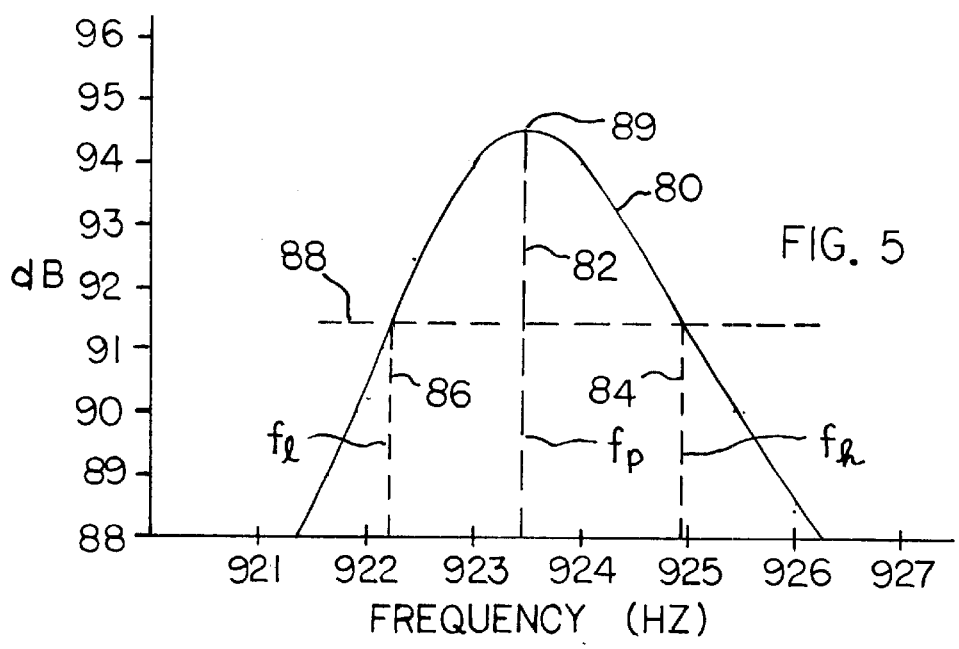
FIG. 5 is a graph depicting the relationship between input wave frequency and peak decibel output, according to the invention.

As shown in FIG. 5, $f_p$ is designated by numeral 82, $f_h$ is designated by numeral 84, and $f_l$ is designated by numeral 86. The frequency values for $f_h$ and $f_l$ are taken as the points on the X axis where curve 80 intersects an imaginary horizontal line 88 located 3 db down from the peak 89. It should be noted that other formulas can be used to determine the damping factor-Q in the frequency domain, from the output of an FFT analyzer.

The Q-factor can be computed from a single curve 80, i.e. a curve generated while the test part has a single fixed location, in which the antinode 78 (FIG. 4) is aligned with the exciter coil 46. However, the FIG. 4 process of determining the antinode location may not be precise in every situation, i.e. the actual antinode may vary slightly from the location indicated by point 78 on curve 76 in FIG. 4. Therefore, it may be desirable to take Q-factor measurements at more than one test part location, e.g. a location indicated by point 78 on curve 76, and two other locations spaced a few degrees on either side of point 78.

A curve 80 can be generated for each location of the test part, so that a Q-factor can be computed for each test part location. The highest computed Q-factor can be considered the Q-factor for the test part.

The described method of determining the vibration damping Q-factor differs from the method described in U.S. Pat. No. 6,014,899, in that in the present invention the Q-factor is determined by varying the frequency of the applied waveform; in the method of U.S. Pat. No. 6,014,899 the applied waveform has a single frequency. In U.S. Pat. No. 6,014,899 the Q-factor is determined by abruptly terminating the applied waveform, and measuring the slope of the decaying output waveform over time. In the present invention the Q-factor is measured by measuring the amplitude peak over a range of different input frequencies. In a shorthand sense, the present invention may be considered as a process performed in the frequency domain, whereas the invention of U.S. Pat. No. 6,014,899 may be viewed as a process performed in the time domain.

What is claimed:

1. A method of measuring the vibration damping of a test part comprising:

vibrating the test part at a plurality of selected frequencies;

measuring the amplitude of vibration generated at each of the plurality of selected frequencies;

generating a measurement curve plotting the measured vibration amplitudes against frequency;

determining computing the vibration damping capability of the test part based on the generated measurement curve; and determining a damping Q-factor as the peak value on said measurement curve divided by the high and low frequencies on said curve at a measuring plane taken a predetermined distance below said peak value.

2. The method of claim 1, wherein said measuring plane is spaced three decibels below the peak value on said measurement curve.

3. The method of claim 1, wherein vibrating the test part at a plurality of selected frequencies comprises varying an input frequency about a resonant frequency of the test part.

4. The method of claim 3, wherein the selected frequencies are frequencies located in close proximity to the resonant frequency.

5. The method of claim 3, wherein the selected frequencies are centered on both sides of the resonant frequency.

6. The method of claim 1, wherein vibrating at the selected frequencies and measuring the amplitude of vibration are performed with the test part located so that an antinode on the test part is aligned with the vibration source.

7. The method of claim 1, wherein vibrating at the selected frequencies and measuring the amplitude of vibration are repeated with the test part in different locations relative to the vibration source.

8. The method of claim 7, wherein the test part locations include a first location wherein an antinode on the test part is aligned with the vibration source, a second location wherein the antinode is slightly displaced in one direction from a position aligned with the vibration source, and a third location wherein the antinode is slightly displaced in an opposite direction from a position aligned with the vibration source.

9. The method of claim 1, and further comprising determining an antinode location on said test part by vibrating the test part at its resonant frequency, and varying the position of the test part in relation to the vibration source.

10. The method of claim 9, wherein determining an antinode location comprises the formation of a sine wave plotting peak values of vibration amplitude versus changes in the test pard location.

11. The method of claim 10, wherein an antinode location is determined as a peak on said sine wave.

12. The method of claim 1, comprising processing the measured curve using a fast Fourier transform analysis.

* * * * *